US008653804B2

(12) United States Patent
Lin et al.

(10) Patent No.: US 8,653,804 B2
(45) Date of Patent: Feb. 18, 2014

(54) DISCONTINUOUS CONDUCTION CURRENT MODE MAXIMUM POWER LIMITATION PHOTOVOLTAIC CONVERTER

(75) Inventors: Ray-Lee Lin, Tainan (TW); Hong-Zhi Jhou, Tainan (TW)

(73) Assignee: National Cheng-Kung University, Tainan (TW)

( * ) Notice: Subject to any disclaimer, the term of this patent is extended or adjusted under 35 U.S.C. 154(b) by 91 days.

(21) Appl. No.: 13/288,164

(22) Filed: Nov. 3, 2011

(65) Prior Publication Data

US 2012/0105041 A1 May 3, 2012

(30) Foreign Application Priority Data

Nov. 3, 2010 (TW) .............................. 99137789 A

(51) Int. Cl.
*G05F 1/00* (2006.01)
(52) U.S. Cl.
USPC ........................... 323/285; 323/282; 323/906
(58) Field of Classification Search
USPC .......... 323/222–225, 282–285, 906–907, 299
See application file for complete search history.

(56) References Cited

U.S. PATENT DOCUMENTS

| | | | | |
|---|---|---|---|---|
| 4,494,180 A * | 1/1985 | Streater et al. | ................... | 363/37 |
| 4,620,140 A * | 10/1986 | Chonan | ......................... | 388/816 |
| 5,027,051 A * | 6/1991 | Lafferty | ....................... | 323/222 |
| 5,327,071 A | 7/1994 | Frederick et al. | | |
| 5,867,011 A * | 2/1999 | Jo et al. | ......................... | 323/299 |
| 5,932,994 A * | 8/1999 | Jo et al. | ......................... | 323/222 |
| 6,057,665 A * | 5/2000 | Herniter et al. | ............... | 320/101 |
| 6,310,789 B1 * | 10/2001 | Nebrigic et al. | ................ | 363/60 |
| 6,914,418 B2 * | 7/2005 | Sung | ............................. | 320/140 |
| 2005/0073289 A1 * | 4/2005 | Takada et al. | ................. | 323/282 |
| 2006/0222916 A1 * | 10/2006 | Norimatsu et al. | ............. | 429/23 |
| 2008/0164766 A1 * | 7/2008 | Adest et al. | ...................... | 307/80 |
| 2010/0002470 A1 * | 1/2010 | Kiamilev et al. | ............... | 363/16 |
| 2011/0096579 A1 * | 4/2011 | Klodowski et al. | ........... | 363/132 |

FOREIGN PATENT DOCUMENTS

| | | |
|---|---|---|
| CN | 101290527 A | 10/2008 |
| TW | 200729662 | 5/2008 |
| TW | 201020712 A | 6/2010 |

OTHER PUBLICATIONS

Taiwan Patent Office, Office Action, Patent Application Serial No. TW099137789, Sep. 25, 2013, Taiwan.
Taiwan Patent Office, Office Action, Patent Application Serial No. TW10221299860, Sep. 25, 2013, Taiwan.

* cited by examiner

*Primary Examiner* — Timothy J. Dole
*Assistant Examiner* — Yusef Ahmed
(74) *Attorney, Agent, or Firm* — Rabin & Berdo, P.C. SP

(57) ABSTRACT

A discontinuous conduction current mode maximum power limitation photovoltaic converter connects to a ground and a solar cell having a temperature compensation signal and an output power and being solarized and includes a direct current/direct current voltage converter and a maximum power control circuit. The direct current/direct current voltage converter connects to the solar cell, includes an input terminal and an output terminal, offers a stable voltage and has an output voltage signal and an inner current. The maximum power control circuit connects to the direct current/direct current voltage converter and the solar cell, controls the direct current/direct current voltage converter to limit the output power of the solar cell to maximum and includes a temperature compensation feedback circuit, an output voltage feedback circuit, a current detection circuit and a main control circuit.

9 Claims, 11 Drawing Sheets

DISCONTINUOUS CONDUCTION CURRENT MODE MAXIMUM POWER LIMITATION PHOTOVOLTAIC CONVERTER

FIELD OF THE INVENTION

The present invention is a discontinuous conduction current mode maximum power limitation photovoltaic converter.

BACKGROUND OF THE INVENTION

With reference to FIGS. 1 to 3, a photovoltaic system converter can convert electromagnetic energy into electrical energy by photoelectric effect in a temperature, is known as a solar cell and has a conversion efficiency, illumination (S), an output voltage ($V_{PV}$), an output current ($I_{PV}$), a loading power, a maximum power, an output power ($P_{PV}$), a floating charge voltage ($V_F$) and a different maximum power point at different illuminations (S).

The temperature is comprises a first temperature (T1) and a second temperature (T2). T1 is 298 Kelvin (K). T2 is 338 K. The conversion efficiency is 6% to 30%. The illumination (S) has a unit that is abbreviated as $W/m^2$. The output voltage ($V_{PV}$) is represented by a graph of voltage and current (V-I) with the output current ($I_{PV}$) for different illuminations. The maximum power point is represented by four black points in FIG. 3 and is affected by illumination (S) and temperature. The floating charge voltage divides the graph of voltage and current (V-I) into a current source zone and a voltage source zone.

The voltage zone is a general operational zone of the solar cell and makes the solar cell stable.

If the loading power increases, $I_{PV}$ increases at the same illumination. When the loading power is greater than the maximum power, $V_{PV}$ will decrease suddenly and make the solar cell operate in the current source zone.

Conduction current mode divides a continuous conduction mode (CCM) and a discontinuous conduction mode (DCM) by directing an inductance current. The continuous conduction mode is when minimal inductance current is greater than 0 amperes. The discontinuous conduction mode is when minimal inductance current equal to 0 amperes.

A maximum power point tracker (MPPT) is a logic circuit for keeping the solar cell from operating at a maximum power point, so a state of a solar cell can be observed and PPV can be adjusted near maximum power.

U.S. Pat. No. 5,327,071 discloses a method and an apparatus for efficiently controlling the power output of a solar cell array string or multiple solar cell array strings to achieve a maximum output power from the strings under varying conditions of use. Maximum power output from a solar array string is achieved through control of a pulse width modulated DC/DC buck converter that transfers power from a solar array to a load or battery bus. The input voltage from the solar array to the converter is controlled by a pulse width modulation duty cycle that in turn is controlled by a differential signal comparing the array voltage with a control voltage from a controller. By periodically adjusting the control voltage up or down by a small amount and comparing the power on the load or bus with that generated at different voltage values causes a maximum power output voltage to be obtained. The apparatus is totally modular and additional solar array strings may be added to the apparatus simply be adding converter boards to the apparatus and changing some constants in the controller's control routines.

However, the foregoing maximum power point tracker is designed by a digital circuit that needs an analog to digital converter, a digital to analog converter and Hall device, decreases efficiency and makes the loading power greater than the maximum power.

Accordingly, a new photovoltaic converter needs to have an analog maximum power point tracker designed with a maximum power limiter.

SUMMARY OF THE INVENTION

The primary objective of the present invention is to design an analog maximum power point tracker with maximum power limitation.

A discontinuous conduction current mode maximum power limitation photovoltaic converter on in accordance with the present invention connects to a ground and a solar cell having a temperature compensation signal and an output power and is solarized and comprises a direct current/direct current voltage converter and a maximum power control circuit.

The direct current/direct current voltage converter connects to the solar cell, comprises an input terminal and an output terminal, offers a stable voltage and has an output voltage signal and an inner current.

The maximum power control circuit connects to the direct current/direct current voltage converter and the solar cell, controls the direct current/direct current voltage converter to limit the output power of the solar cell is maximum and comprises a temperature compensation feedback circuit, an output voltage feedback circuit, a current detection circuit and a main control circuit.

The temperature compensation feedback circuit connects to the input terminal of the direct current/direct current voltage converter and transmits the temperature compensation signal of the solar cell.

The output voltage feedback circuit connects to the output terminal of the direct current/direct current voltage converter and transmits the output voltage signal of the direct current/direct current voltage converter.

The current detection circuit connects to the direct current/direct current voltage converter and detects the inner current of the direct current/direct current voltage converter.

The main control circuit comprises an output and connects to the solar cell and outputs a control signal to limit the output power of the solar cell to a maximum according to the temperature compensation signal, the output voltage signal and the inner current.

DETAILED DESCRIPTION OF THE PRESENT INVENTION

Figure 1:
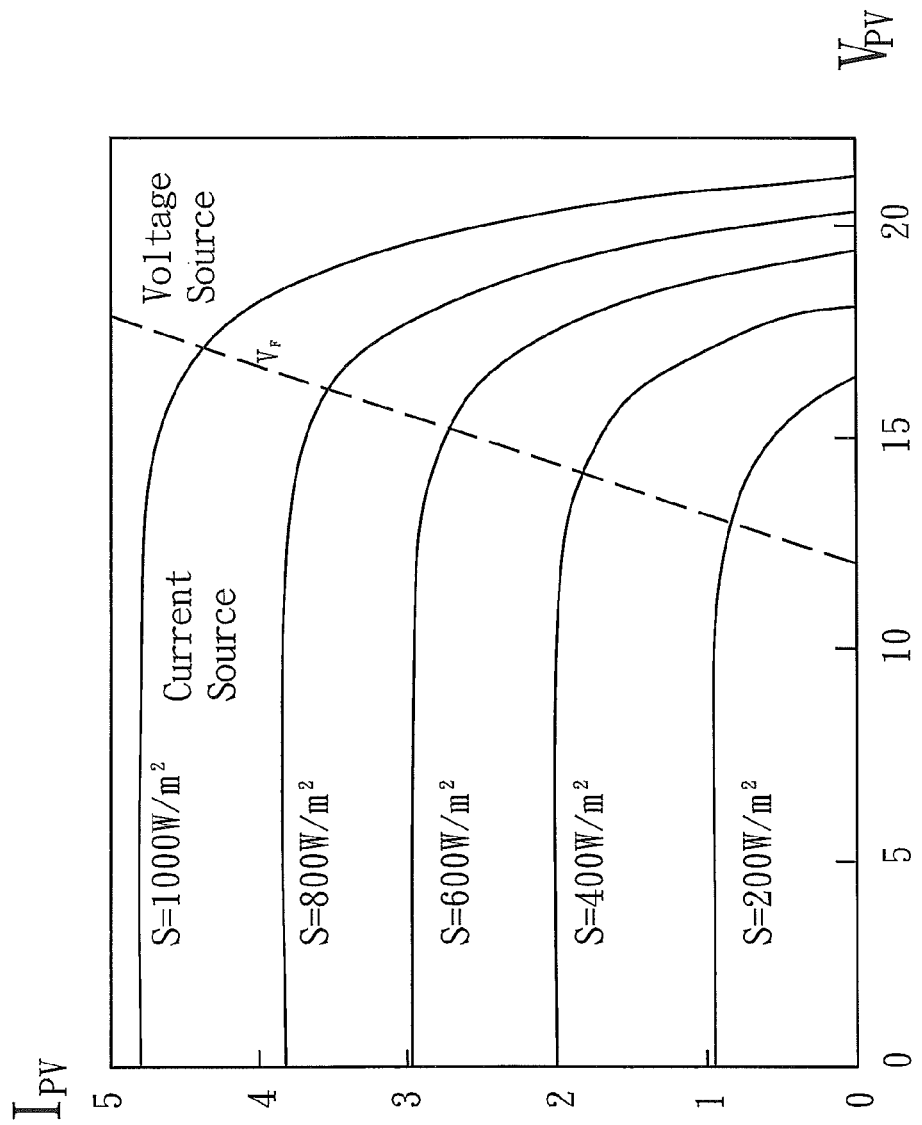
FIG. 1 is a graph of voltage and current (V-I) in accordance with a solar cell.
Figure 2:
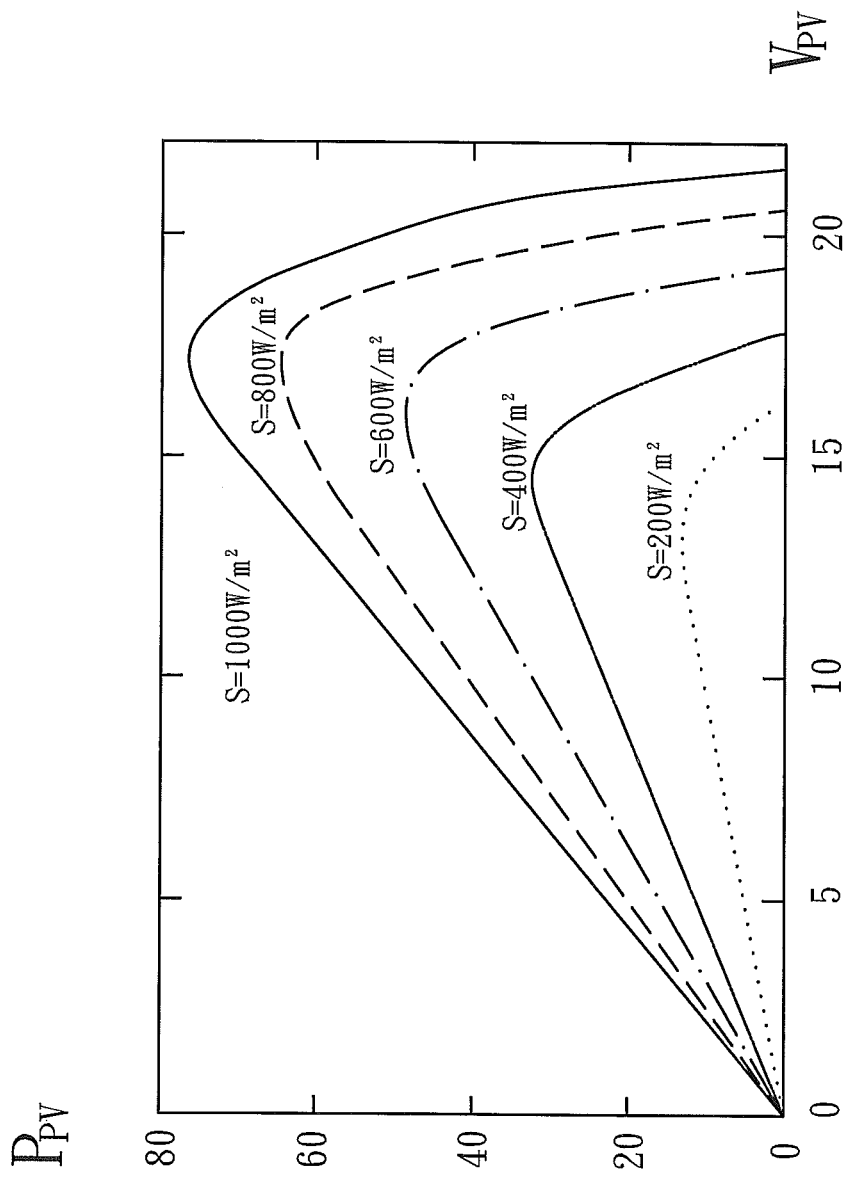
FIG. 2 is a graph of voltage and power (V-P) in accordance with a solar cell.
Figure 3:
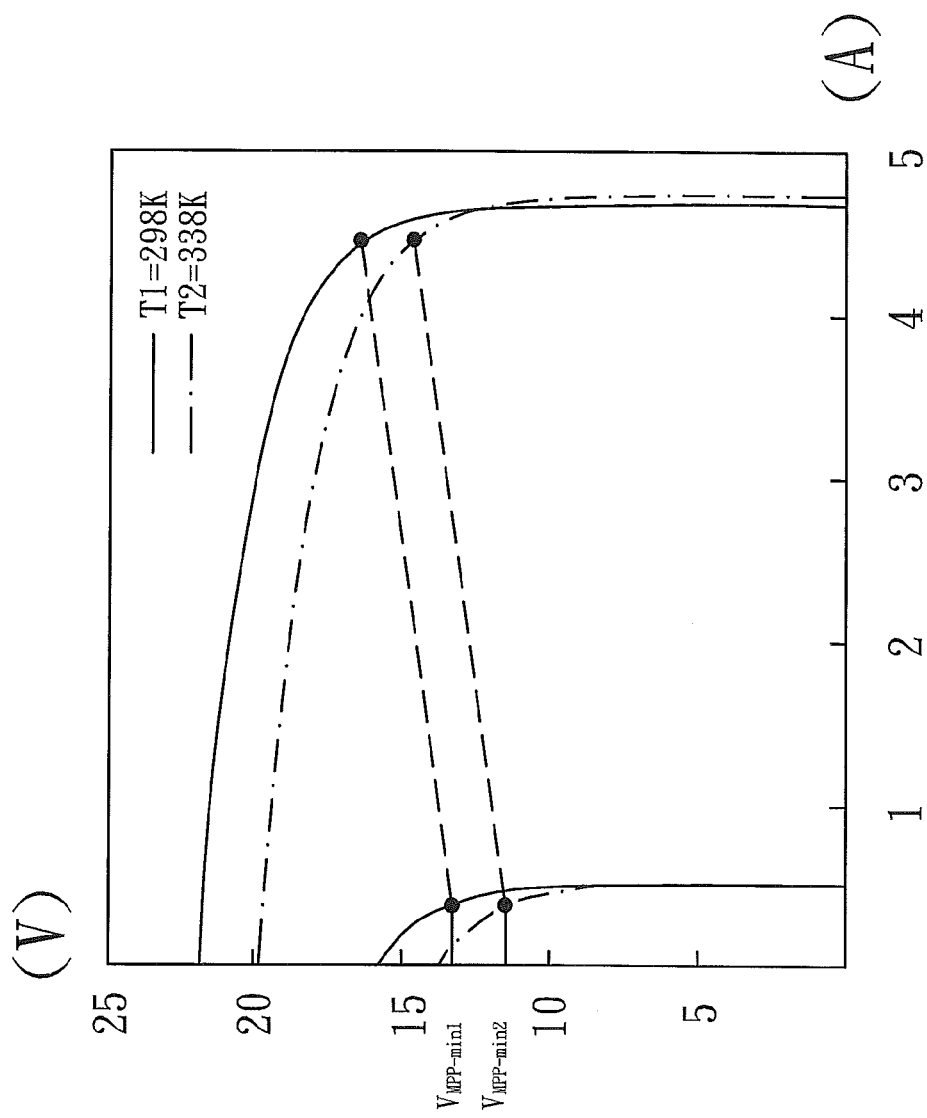
FIG. 3 is a graph of voltage and current (V-I) in different temperature in accordance with a solar cell.
Figure 4:
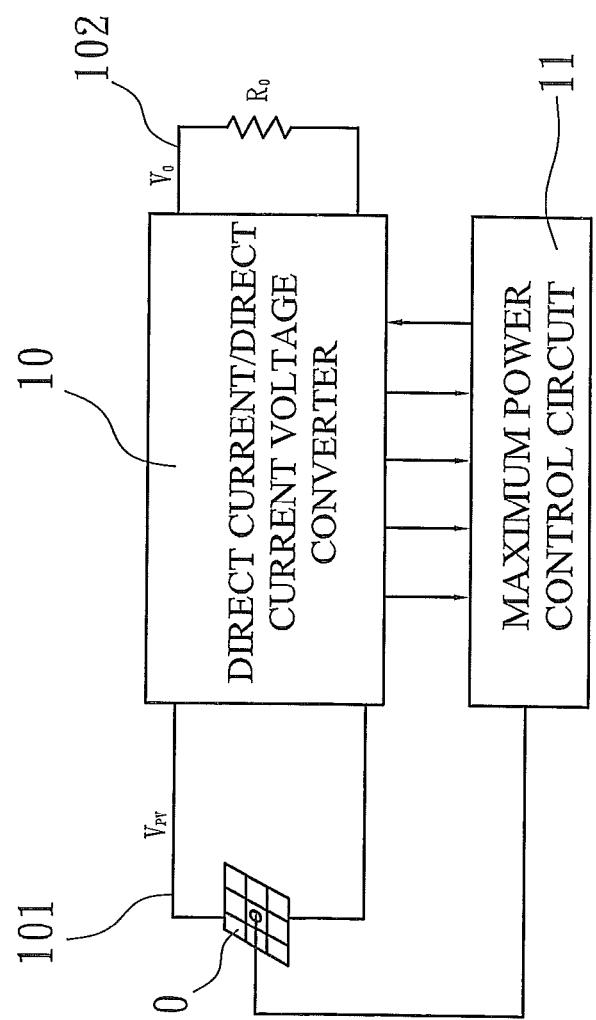
FIG. 4 is a block diagram of a first embodiment of a discontinuous conduction current mode maximum power limitation photovoltaic converter in accordance with the present invention.
Figure 5:
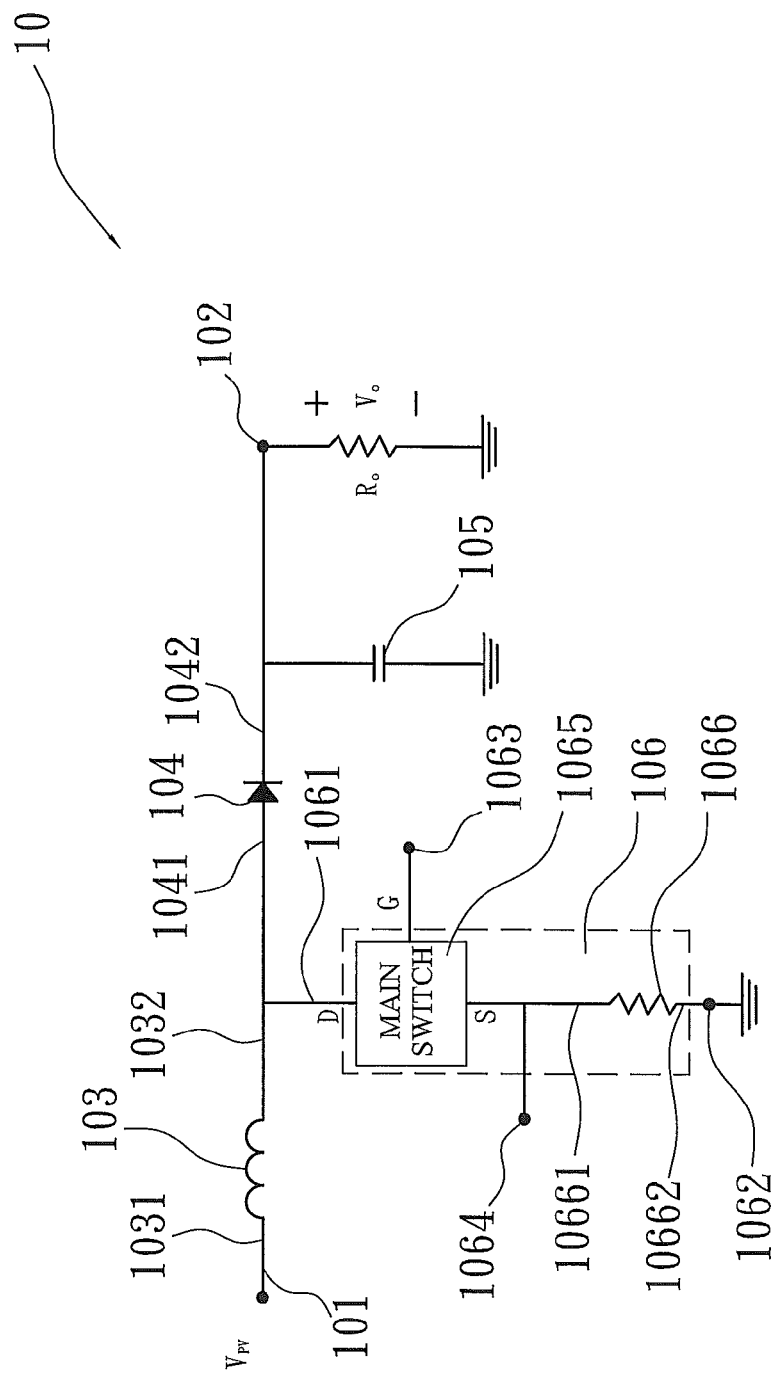
FIG. 5 is a circuit diagram of a direct current/direct current voltage converter in accordance with the present invention.
Figure 6:
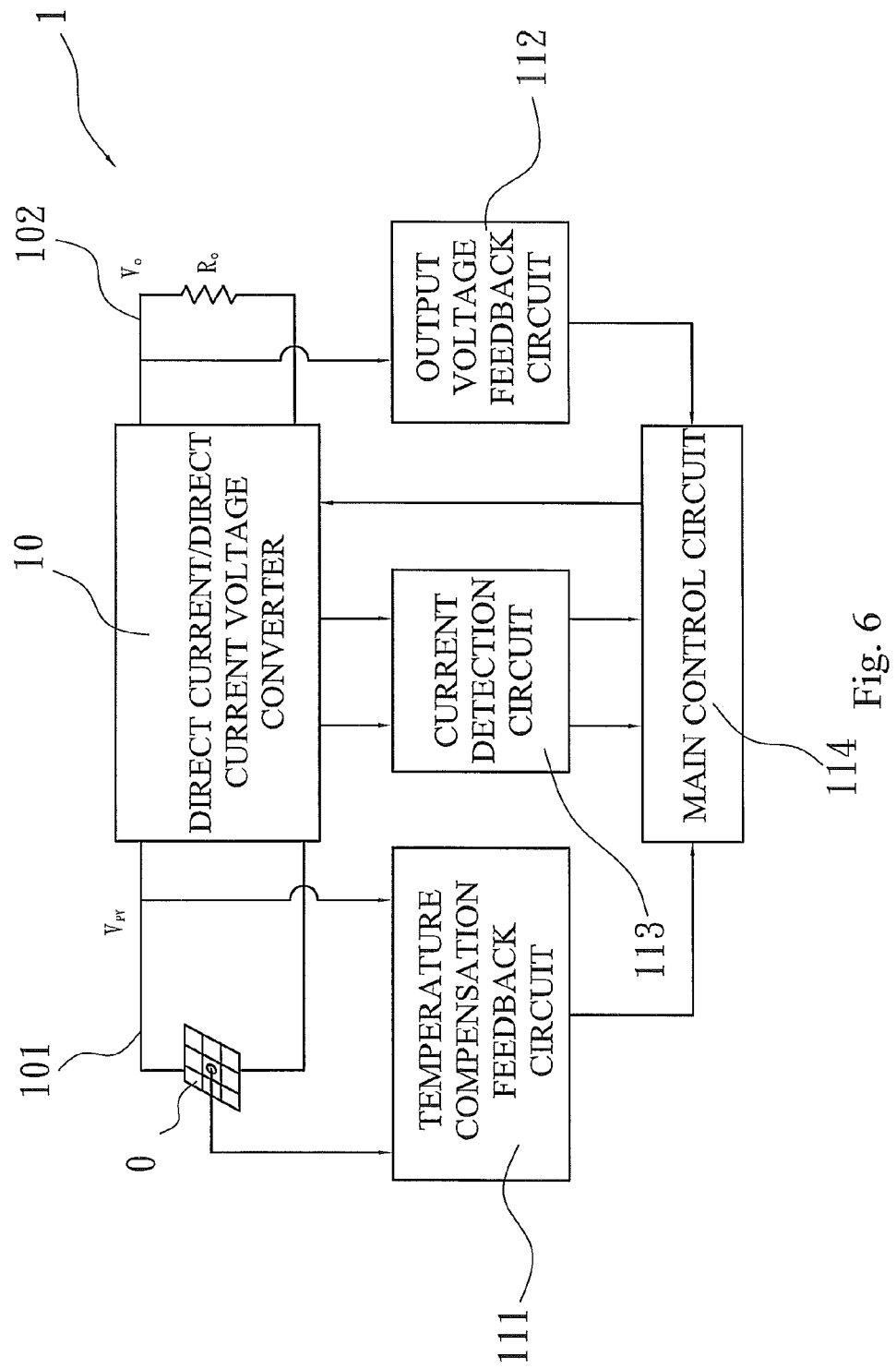
FIG. 6 is a block diagram of a second embodiment of a discontinuous conduction current mode maximum power limitation photovoltaic converter in accordance with the present invention.
Figure 7:
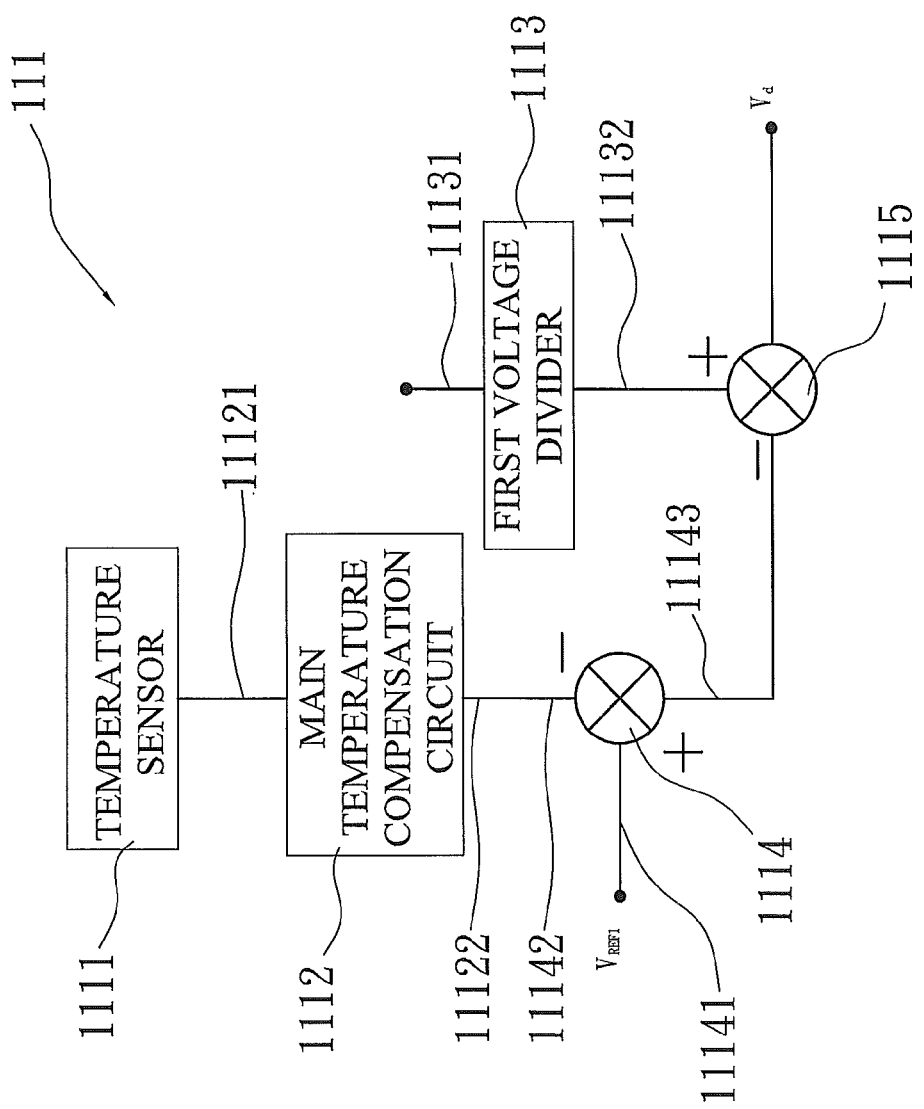
FIG. 7 is a circuit diagram of a temperature compensation feedback circuit in accordance with the present invention.
Figure 8:
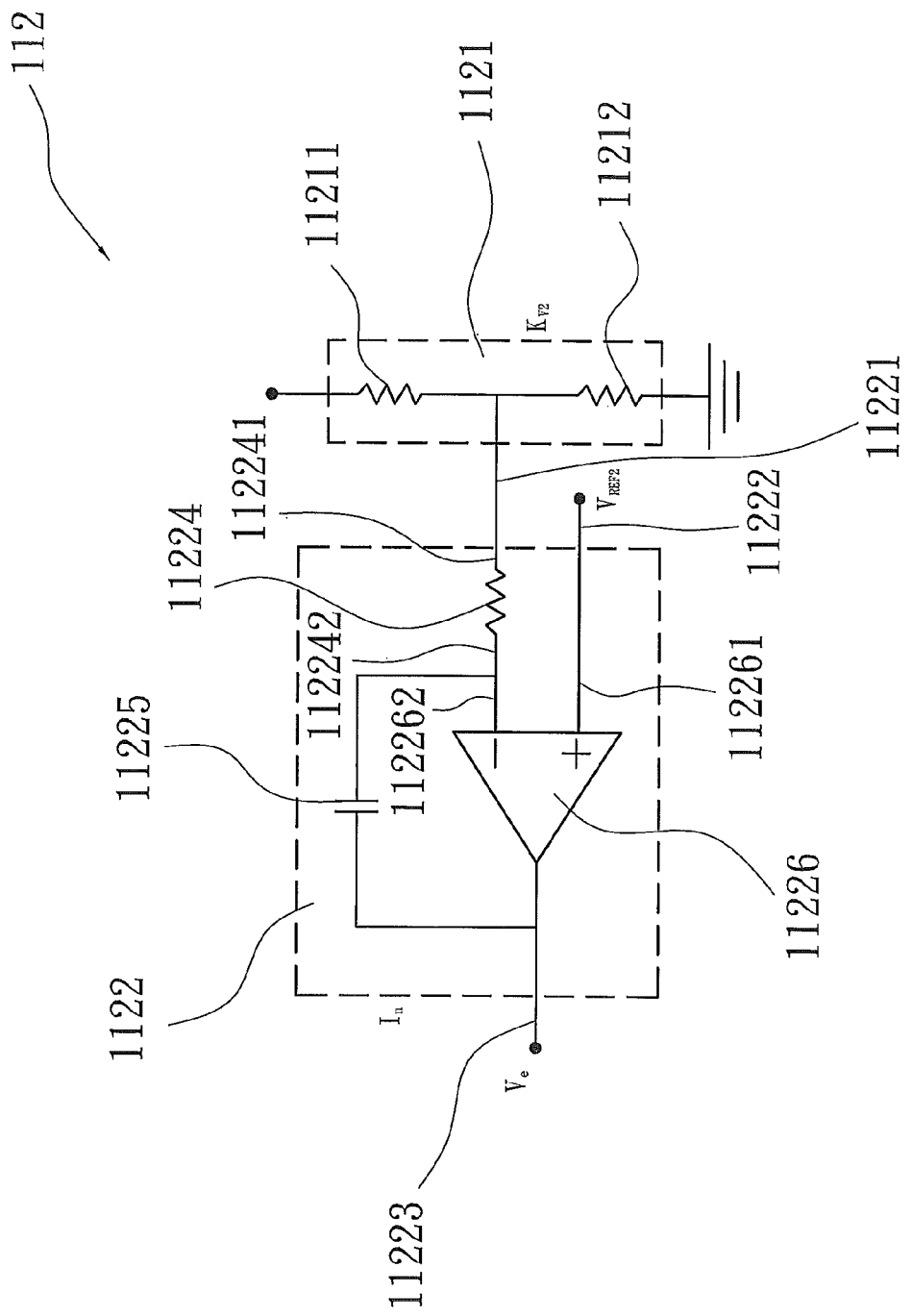
FIG. 8 is a circuit diagram of an output voltage feedback circuit in accordance with the present invention.
Figure 9:
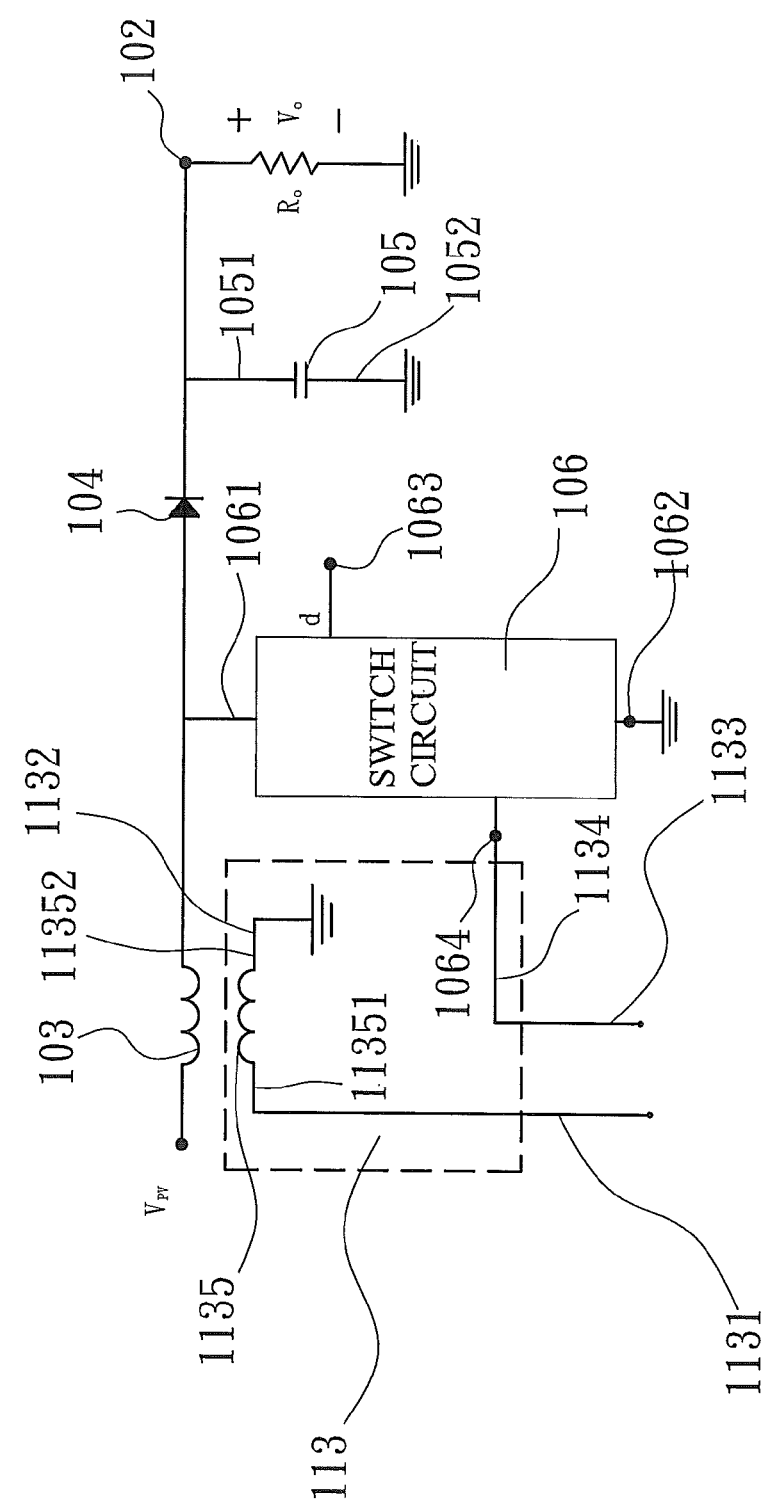
FIG. 9 is a circuit diagram of a current detection circuit in accordance with the present invention.
Figure 10:
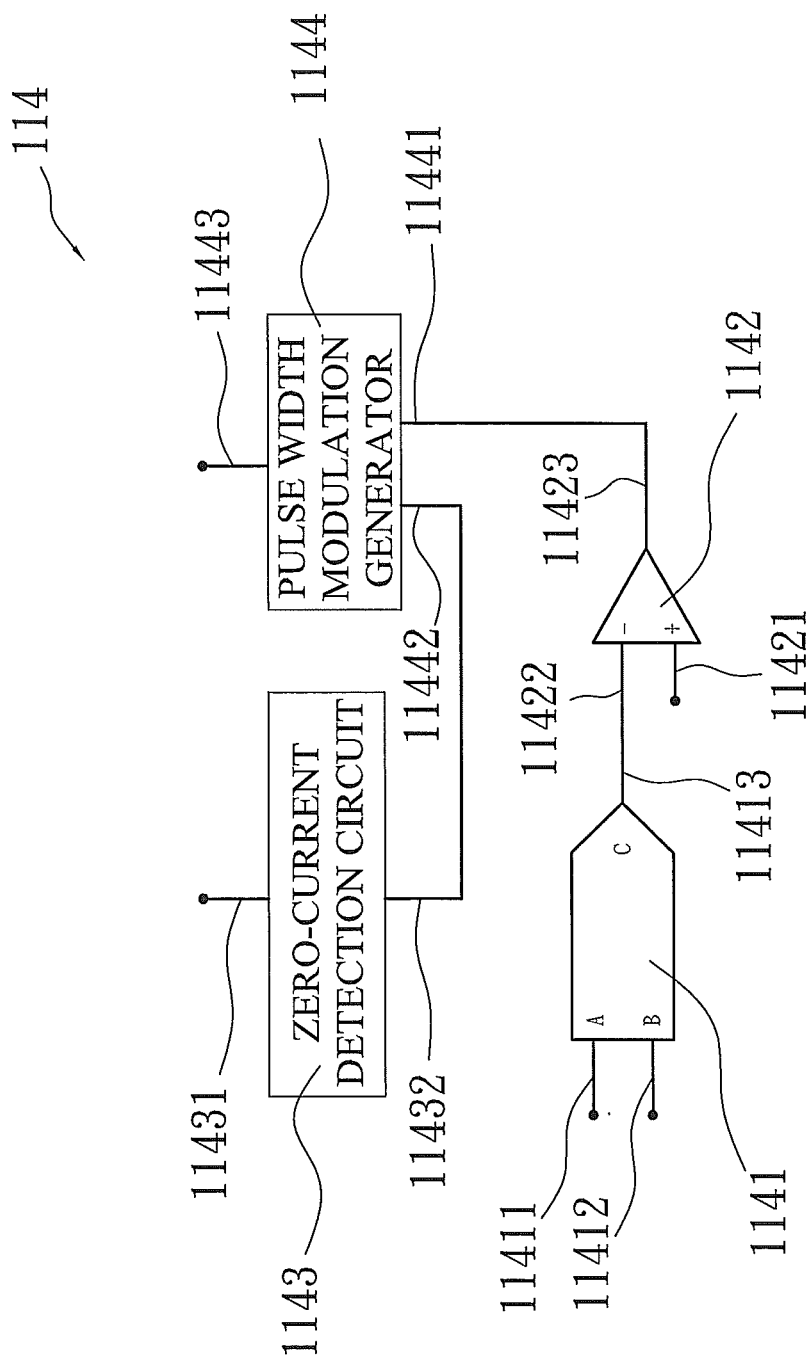
FIG. 10 is a circuit diagram of a main control circuit in accordance with the present invention.
Figure 11:
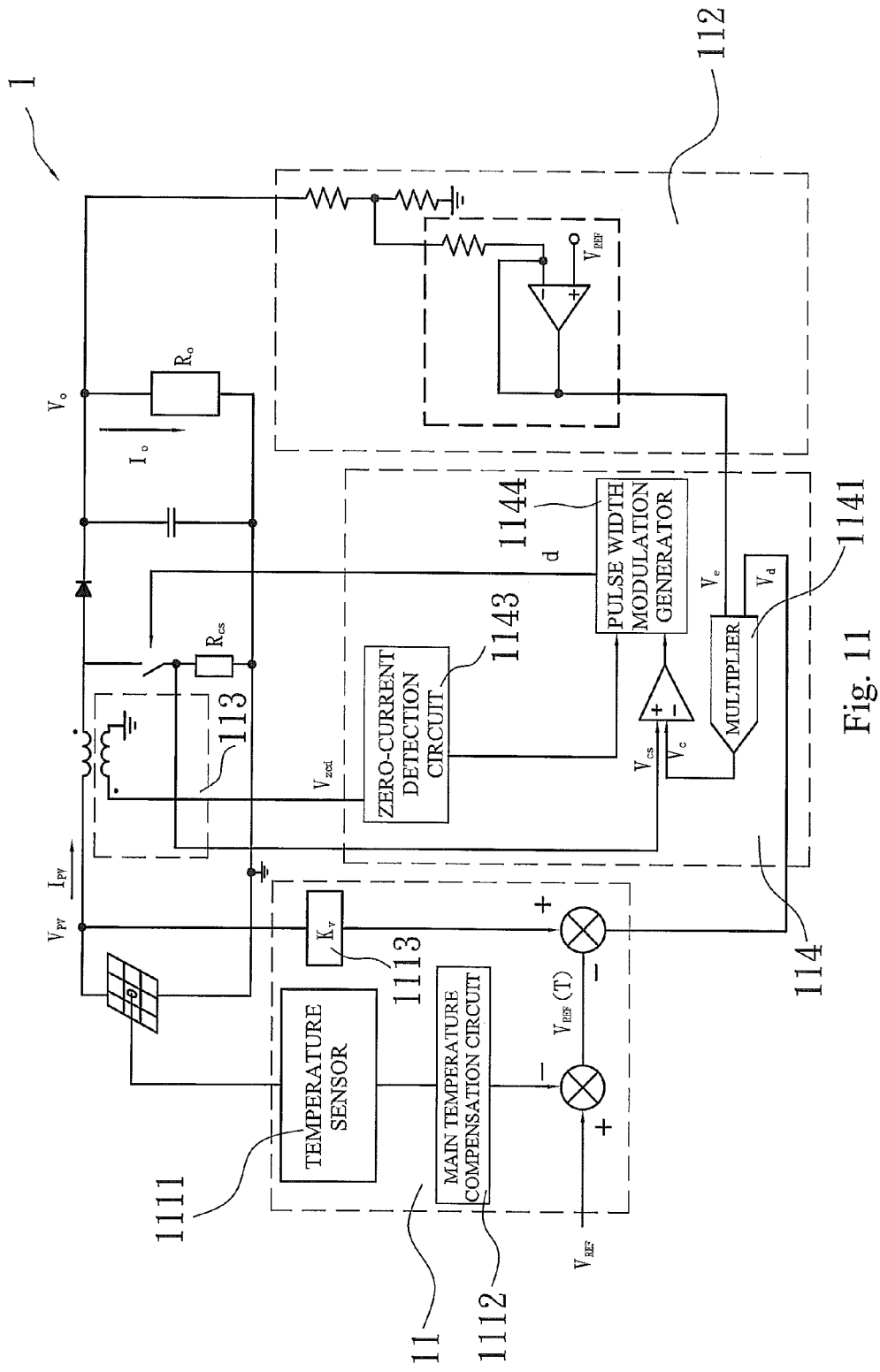
FIG. 11 is a circuit diagram of a first embodiment of a discontinuous conduction current mode maximum power limitation photovoltaic converter in FIG. 3.

With reference to FIGS. 4 to 11, a discontinuous conduction current mode maximum power limitation photovoltaic converter (1) in accordance with the present invention connects to a ground and a solar cell (0) having a temperature compensation signal and an output power and is solarized and comprises a direct current/direct current voltage converter (10) and a maximum power control circuit (11).

The direct current/direct current voltage converter (10) connects to the solar cell (0), comprises an input terminal (101), an output terminal (102), an optional main inductor (103), an optional rectifier (104), an optional main capacitor (105) and an optional switch circuit (106), offers a stable voltage and has an output voltage signal and an inner current.

The main inductor (103) comprises a first end (1031) and a second end (1032). The first end (1031) of the main inductor (103) connects to the input terminal (101) of the direct current/direct current voltage converter (10).

The rectifier (104) comprises an anode (1041) and a cathode (1042). The anode (1041) of the rectifier (104) connects to the second end (1032) of the main inductor (103).

The main capacitor (105) comprises a first end (1051) and a second end (1052). The first end (1051) of the main capacitor (105) connects to the cathode of the rectifier (104). The second end (1052) of the main capacitor (105) connects to the ground.

The switch circuit (106) comprises a first terminal (1061), a second terminal (1062), a third terminal (1063), a fourth terminal (1064), an optional main switch (1065) and an optional first resistor (1066). The first terminal (1061) connects to the anode (1041) of the rectifier (104). The second terminal (1062) connects to the ground. The main switch (1065) is an enhanced N type metal-oxide-semiconductor field effect transistor (NMOSFET) and comprises a drain (D), a gate (G) and a source (S). The drain (D) of the main switch (1065) connects to the anode (1041) of the rectifier (104). The first resistor (1066) comprises a first end (10661) and a second end (10662). The first end (10661) of the first resistor (1066) connects to the source (S) of the main switch (1065). The second end (10662) of the first resistor (1066) connects to the ground.

The maximum power control circuit (11) connects to the direct current/direct current voltage converter (10) and the solar cell (0), controls the direct current/direct current voltage converter (10) to limit the output power of the solar cell (0) to maximum and comprises a temperature compensation feedback circuit (111), an output voltage feedback circuit (112), a current detection circuit (113) and a main control circuit (114).

The temperature compensation feedback circuit (111) connects to the input terminal (101) of the direct current/direct current voltage converter (10), transmits the temperature compensation signal of the solar cell (0) and comprises at least one optional temperature sensor (1111), an optional main temperature compensation circuit (1112), an optional first voltage divider (1113), an optional first subtractor (1114) and an optional second subtractor (1115).

The temperature sensor (1111) senses the temperature of the solar cell (0).

The main temperature compensation circuit (1112) comprises an input (11121) and an output (11122). The input (11121) of the main temperature compensation circuit (1112) connects to the temperature sensor (1111).

The first voltage divider (1113) comprises an input (11131), an output (11132), a third resistor and a fourth resistor.

The input (11131) of the first voltage divider (1113) connects to the input terminal (101) of the direct current/direct current voltage converter (10).

The third resistor of the first voltage divider (1113) comprises a first end and a second end. The first end of the third resistor connects to the input (11131) of the first voltage divider (1113).

The fourth resistor of the first voltage divider (1113) comprises a first end and a second end. The first end of the fourth resistor connects to the second end of the third resistor. The second end of the fourth resistor connects to the ground.

The first subtractor (1114) comprises an anode (11141), a cathode (11142) and an output (11143). The anode (11141) of the first subtractor (1114) connects to a first reference voltage ($V_{REF1}$). The cathode (11142) of the first subtractor (1114) connects to the output (11122) of the main temperature compensation circuit (1112) and generates an input voltage. The output (11143) of the first subtractor (1114) outputs an output voltage that is the first reference voltage ($V_{REF1}$) subtracts the input voltage of the cathode (11142) of the first subtractor (1114).

The second subtractor (1115) comprises an anode, a cathode and an output. The anode of the second subtractor (1115) connects to the output (11132) of the first voltage divider (1113) and generates an input voltage. The cathode of the second subtractor (1115) connects to the output (11143) of the first subtractor (1114) and generates an input voltage. The output of the second subtractor (1115) outputs an output voltage that the input voltage of the anode of the second subtractor (1115) subtracts the input voltage of the cathode of the second subtractor (1115).

The output voltage feedback circuit (112) connects to the output terminal (102) of the direct current/direct current voltage converter (10), transmits the output voltage signal of the direct current/direct current voltage converter (10) and comprises a second voltage divider (1121) and an integrator (1122).

The second voltage divider (1121) comprises an input (11211) and an output (11212). The input (11211) of the second voltage divider (1121) connects to the output terminal (102) of the direct current/direct current voltage converter (10).

The integrator (1122) comprises a first input (11221), a second input (11222), an output (11223), a second resistor (11224), a capacitor (11225) and an operational amplifier (11226).

The first input (11221) of the integrator (1122) connects to the output (11212) of the second voltage divider (1121).

The second input (11222) of the integrator (1122) connects to a second reference voltage ($V_{REF2}$).

The output (11223) of the integrator (1122) outputs a voltage variance between the first input (11221) and second input (11222) of the integrator (1122) is amplified and time-integrated.

The second resistor (11224) comprises a first end (112241) and a second end (112242). The first end (112241) of the second resistor (11224) connects to the output (11212) of the second voltage divider (1121).

The capacitor (11225) connects to the second end (112242) of the second resistor (11224).

The operational amplifier (11226) comprises a positive input (112261) and a negative input (112262). The positive input (112261) of the operational amplifier (11226) connects to the second reference voltage ($V_{REF2}$). The negative input (112262) of the operational amplifier (11226) connects to the second end (112242) of the second resistor (11224).

The current detection circuit (113) connects to the direct current/direct current voltage converter (10), the third terminal (1063) of the switch circuit (106) and the source (S) of the main switch (1065), detects the inner current of the direct current/direct current voltage converter (10) and comprises a first end (1131), a second end (1132), a third end (1133), a fourth end (1134) and a coupling inductance (1135). The second end (1132) of the current detection circuit (113) connects to the ground. The fourth end (1134) of the current detection circuit (113) connects to the third end (1133) of the current detection circuit (113). The coupling inductance (1135) of the current detection circuit (113) inductive couples with the main inductor (103) of the direct current/direct current voltage converter (10) and comprises a first end (11351) and a second end (11352).

The main control circuit (114) connects to the first terminal (1061) of the switch circuit (106) and comprises an output, an optional multiplier (1141), an optional comparator (1142), an optional zero-current detection circuit (1143) and an pulse width modulation generator (1144), connects to the solar cell (0) and outputs a control signal to limit the output power of the solar cell (0) to maximum according to the temperature compensation signal, the output voltage signal and the inner current.

The main control circuit (114) connects to the fourth terminal (1064) of the switch circuit (106) and comprises an output, an optional multiplier (1141), an optional comparator (1142), an optional zero-current detection circuit (1143) and an pulse width modulation generator (1144), connects to the solar cell (0) and outputs a control signal to limit the output power of the solar cell (0) to maximum according to the temperature compensation signal, the output voltage signal and the inner current.

The comparator (1142) comprises a positive input (11421), a negative input (11422) and an output (11423). The positive input (11421) of the comparator (1142) connects to the current detection circuit (113). The negative input (11422) of the comparator (1142) connects to the output (11413) of the multiplier (1141).

The zero-current detection circuit (1143) comprises at least one input (11431) and an output (11432). The input (11431) of the zero-current detection circuit (1143) connects to the current detection circuit (113).

The pulse width modulation generator (1144) connects to the gate (G) of the main switch (1065), generates a pulse width modulation signal to control the direct current/direct current voltage converter (10) and comprises a first input (11441), a second input (11442) and an output (11443). The first input (11441) of the pulse width modulation generator (1144) connects to the output (11423) of the comparator (1142). The second input (11442) of the pulse width modulation generator (1144) connects to the output (11432) of the zero-current detection circuit (1143). The output (11443) of the pulse width modulation generator (1144) connects to the direct current/direct current voltage converter (10).

Various changes can be made without departing from the broad spirit and scope of the invention.

What is claimed is:

1. A discontinuous conduction current mode maximum power limitation photovoltaic converter connecting to a ground and a solar cell having a temperature compensation signal and an output power and being solarized and comprising
    a direct current/direct current voltage converter connecting to the solar cell, comprising an input terminal and an output terminal, offering a stable voltage and having an output voltage signal and an inner current; and
    a maximum power control circuit connecting to the direct current/direct current voltage converter and the solar cell, controlling the direct current/direct current voltage converter to limit the output power of the solar cell to maximum and comprising
        a temperature compensation feedback circuit connecting to the input terminal of the direct current/direct current voltage converter and transmitting the temperature compensation signal of the solar cell;
        an output voltage feedback circuit connecting to the output terminal of the direct current/direct current voltage converter and transmitting the output voltage signal of the direct current/direct current voltage converter;
        a current detection circuit connecting to the direct current/direct current voltage converter and detecting the inner current of the direct current/direct current voltage converter; and
        a main control circuit comprising an output and connecting to the solar cell and outputting a control signal to limit the output power of the solar cell to maximum according to the temperature compensation signal, the output voltage signal and the inner current;
    wherein the temperature compensation feedback circuit further comprises
        at least one temperature sensor sensing the temperature of the solar cell;
        a main temperature compensation circuit comprising
            an input connecting to the temperature sensor; and
            an output;
        a first voltage divider comprising
            an input connecting to the input terminal of the direct current/direct current voltage converter; and
            an output;
        a first subtractor comprising
            an anode connecting to a first reference voltage;
            a cathode connecting to the output of the main temperature compensation circuit and generating an input voltage; and
            an output outputting an output voltage that is the first reference voltage subtracts the input voltage of the cathode of the first subtractor; and
        a second subtractor comprising
            an anode connecting to the output of the first voltage divider and generating an input voltage; and
            a cathode connecting to the output of the first subtractor and generating an input voltage; and
                an output outputting an output voltage that the input voltage of the anode of the second subtractor subtracts the input voltage of the cathode of the second subtractor.

2. The discontinuous conduction current mode maximum power limitation photovoltaic converter as claimed in claim 1, wherein the output voltage feedback circuit further comprises
    an second voltage divider comprising
        an input connecting to the output terminal of the direct current/direct current voltage converter; and an output; and
an integrator comprising
a first input connecting to the output of the second voltage divider;
a second input connecting to a second reference voltage; and
an output outputting a voltage variance between the first input and second input of the integrator being amplified and being time-integrated.

3. The discontinuous conduction current mode maximum power limitation photovoltaic converter as claimed in claim 2, wherein the integrator further comprises
a second resistor comprising
a first end connecting to the output of the second voltage divider; and
a second end;
a capacitor connecting to the second end of the second resistor; and
an operational amplifier comprising
a positive input connecting to the second reference voltage ($V_{REF2}$); and
a negative input connecting to the second end of the second resistor.

4. The discontinuous conduction current mode maximum power limitation photovoltaic converter as claimed in claim 1, wherein the main control circuit further comprises
a multiplier comprising
a first input connecting to the temperature compensation feedback circuit and producing a first input voltage signal;
a second input connecting to the output voltage feedback circuit and producing a second input voltage signal; and
an output outputting a multiplication of the first input voltage signal and the second input voltage signal;
a comparator comprising
a positive input connecting to the current detection circuit;
a negative input connecting to the output of the multiplier; and
an output;
a zero-current detection circuit comprising
at least one input connecting to the current detection circuit; and
an output; and
a pulse width modulation generator generating a pulse width modulation signal to control the direct current/direct current voltage converter and comprising
a first input connecting to the output of the comparator;
a second input connecting to the output of the zero-current detection circuit; and
an output connecting to the direct current/direct current voltage converter.

5. The discontinuous conduction current mode maximum power limitation photovoltaic converter as claimed in claim 4, wherein the direct current/direct current voltage converter further comprises
a main inductor comprising
a first end connecting to the input terminal of the direct current/direct current voltage converter; and
a second end;
a rectifier comprising
an anode connecting to the second end of the main inductor; and
a cathode;
a main capacitor comprising
a first end connecting to the cathode of the rectifier; and
a second end connecting to the ground; and
a switch circuit comprising
a first terminal connecting to the anode of the rectifier;
a second terminal connecting to the ground;
a third terminal connecting to the current detection circuit; and
a fourth terminal connecting to the output of the main control circuit.

6. The discontinuous conduction current mode maximum power limitation photovoltaic converter as claimed in claim 5, wherein the switch circuit further comprises
a main switch being an enhancement N type metal-oxide-semiconductor field effect transistor (NMOSFET) and comprising
a drain connecting to the anode of the rectifier;
a gate connecting to the output of the pulse width modulation generator; and
a source connecting to the current detection circuit; and
a first resistor comprising
a first end connecting to the source of the main switch; and
a second end connecting to the ground.

7. The discontinuous conduction current mode maximum power limitation photovoltaic converter as claimed in claim 5, wherein the current detection circuit further comprises
a first end;
a second end connecting to the ground;
a third end;
a fourth end connecting to the third end of the current detection circuit; and
a coupling inductance inductive coupling with the main inductor of the direct current/direct current voltage converter and comprising a first end and a second end.

8. The discontinuous conduction current mode maximum power limitation photovoltaic converter as claimed in claim 1, wherein the first voltage divider further comprises
a third resistor comprising
a first end connecting to the input of the first voltage divider; and
a second end;
a fourth resistor comprising
a first end connecting to the second end of the third resistor; and
a second end connecting to the ground.

9. The discontinuous conduction current mode maximum power limitation photovoltaic converter as claimed in claim 1, wherein the first voltage divider further comprises
a third resistor comprising
a first end connecting to the input of the second voltage divider; and
a second end; and
a fourth resistor comprising
a first end connecting to the second end of the third resistor; and
a second end connecting to the ground.

* * * * *